Dec. 19, 1933.   J. KARITZKY   1,939,983
SPRING TOGGLE
Filed March 18, 1932
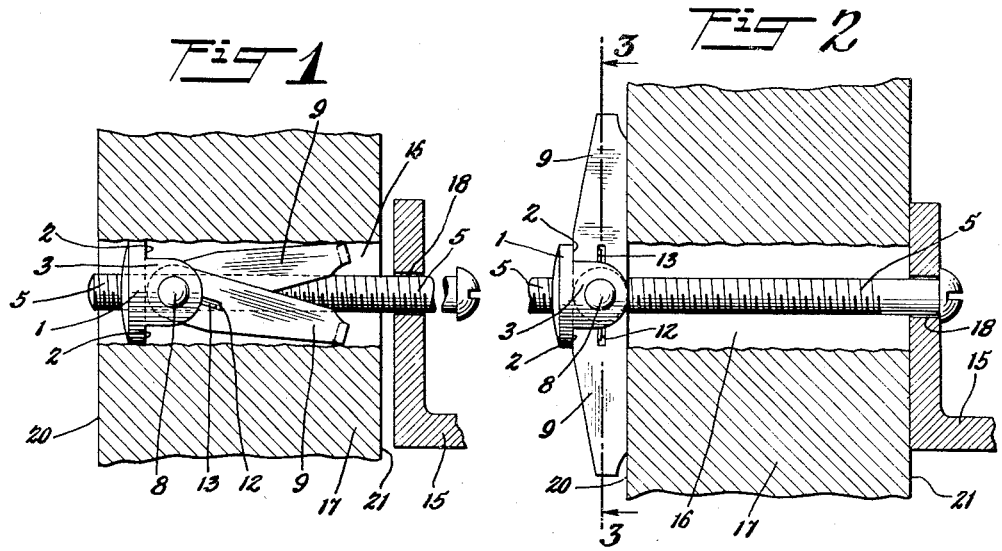
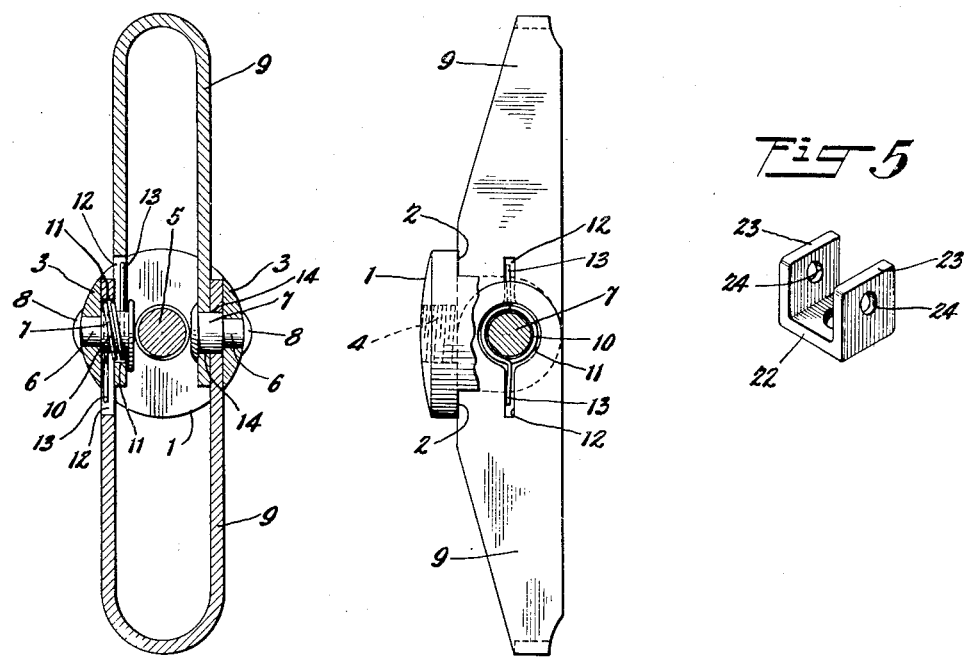
John Karitzky
INVENTOR
BY Alan M. Johnson
ATTORNEY Patented Dec. 19, 1933

1,939,983

UNITED STATES PATENT OFFICE 1,939,983

SPRING TOGGLE

John Karitzky, Garwood, N. J., assignor to Henry B. Newhall Corporation, Garwood, N. J., a corporation of New Jersey Application March 18, 1932. Serial No. 599,723

12 Claims. (Cl. 85—2.4)

My invention relates to toggle bolts, which are well known in the trade, and more particularly to a spring toggle bolt of the minimum cross section, for the particular load it is to carry, to the end that a hole of minimum diameter only need be drilled, or otherwise formed, in the wall or other support. This will insure a quicker application, and a neater and more artistic job.

My invention further relates to such a spring toggle in which the spring is practically concealed and protected, making a very serviceable and artistic article of manufacture, and one that can be manufactured at reasonable cost.

My invention further relates to certain combinations, sub-combinations, articles of manufacture and details of construction, all of which will be more fully hereinafter described and pointed out in the claims.

In the figures I have shown two embodiments of my invention by way of example, the same reference numerals refer to similar parts of the several figures.

Fig. 1 is a vertical section through a wall or other support, and the work supported, the toggle bolt being in side elevation and about to be expanded behind the wall;

Fig. 2 is a vertical section, similar to Fig. 1, showing the toggle bolt expanded and the work held to the wall;

Fig. 3 is a section, on line 3—3, of Fig. 2, looking in the direction of the arrows;

Fig. 4 is a side elevation partly broken away, one of the rivets being in section;

Fig. 5 is a perspective view of a modified form of saddle which I may employ.

To reduce the cost of installing such toggle bolts, it is very desirable to reduce the diameter of the hole which has to be drilled, or otherwise formed in the support, which is usually stone, masonry, terra cotta, brick, concrete or similar material. In certain instances such toggle bolts are used in metal construction. But in all locations, larger the hole more time and expense is required to form it. Again, a small hole is desirable as it does not mar the face of the wall or detract from the artistic workmanship of the job.

For any and all of these reasons, I have invented a spring toggle bolt of the minimum diameter, for a given load that it has to support, and one that will require the minimum size hole to be drilled in the wall or other support, thereby cheapening the cost of installation, and enhancing the artistic appearance of the completed job.

My toggle bolt is also one that can be manufactured at minimum expense.

In the particular embodiment of my invention shown by way of example, 1 is a saddle provided with stops 2, 2 and with ears 3, 3. The saddle is also provided with female screw threads 4 to co-operate with the stove or other bolt 5.

In the ears 3, 3 I mount any suitable pivots. I have shown these pivots as rivets 6, 6 having an enlarged bearing surface 7, 7. The ends 8, 8 of the rivets are upset. On at least one of these rivets I mount a resilient member adapted to move the wings in one direction. In the embodiment of the invention illustrated by way of example, the coil of the coil spring 10 is mounted on the rivet on the left of Figure 3. On this coil of the coil spring 10, and forming a bearing for the two adjacent enlarged pivoting apertures or holes 11, 11, are mounted the two adjacent ends of the two wings 9, 9.

It will, therefore, be seen that the resilient means forms a bearing for these two adjacent ends of the wing, and, as its coil is of substantially the thickness of the two arms of the wings mounted upon it, the resilient means is housed within the structure of the wings themselves and concealed by said wings. In some cases (not shown) all the four holes of the two wings 9, 9 may be enlarged over and above a diameter sufficient to permit them to pivot upon the enlarged portion 7, 7 of the rivets, so that two, instead of one, spring 10, or other resilient means, may be mounted within the ends of the wings 9, 9.

Each enlarged opening 11, 11 is provided with a small slot 12 within which lie the ends 13, of the coil spring 10. The other pivoting openings 14, 14 in each of the wings 9, 9 are preferably of a diameter to permit the wings 9, 9 to pivot on the bearing surface 7, though if desired the openings may be enlarged and another coil spring (not shown) may be mounted on this pivot, as previously noted. It will be seen that the coil of the coil spring 10 is substantially the same length as the thickness of the two arms of the wings 9, 9, so that the spring forms a bearing for at least two of the arms of the wings and is concealed and protected by the wings which form a housing for it. It will also be noted that no space is required between the bolt 5 and the ends of the wings on which to mount the coil spring. This permits my bolt anchor to be of the minimum diameter for the particular work 15 to be supported, with all the advantages previously described.

In operation a hole 16 of the minimum diameter is drilled, or otherwise formed, in the wall or other support 17 of stone, masonry, concrete, brick, terra cotta, or metal or other material. The bolt 5 is then passed through a hole 18 in the work 15 to be supported, and is then threaded through the saddle 1, its threads co-operating with the female threads 4 in the saddle. Then the wings 9, 9 are depressed and the coil spring 10 put under tension usually by the thumb and forefinger of the operator getting the wings into the position shown in Fig. 1. The toggle bolt is then thrust into the hole 16, as shown in Fig. 1. A further movement of the toggle bolt, to the left of Fig. 1, until the ends of the wings pass the inner surface 20 of the wall 17, will cause the wings 9, 9, actuated by the coil spring 10, to fly out until they contact with the stops 2, 2 on the saddle 1, see Fig. 2. By then screwing up on the bolt 5 the work 15 will be securely held to the face 21 of the wall or other support.

In some cases I may employ other forms of saddles. One such form is the channel iron saddle 22 having the ears 23, 23, Fig. 5. The pivots will be mounted in the holes 24, 24 as in the other form.

Having thus described this invention in connection with illustrative embodiments thereof, to the details of which I do not desire to be limited, what is claimed as new and what is desired to secure by Letters Patent is set forth in the appended claims.

What I claim is:—

1. In a spring toggle the combination of a saddle provided with pivots, one or more resilient means mounted on said pivot or pivots, and wings pivoted on said resilient means and adapted to be actuated by said means.

2. In a spring toggle the combination of a saddle provided with pivots, one or more coil springs mounted on said pivot or pivots, and wings mounted on said coil springs and adapted to be actuated by said coil springs.

3. In a spring toggle the combination of a saddle having stops, wings pivoted to the saddle and adapted to rest against the saddle stops when in their operative position, and concealed resilient means adapted to cause the wings to engage with said saddle stops.

4. In a spring toggle the combination of a saddle having stops and pivots, resilient means mounted on one of said pivots, and wings pivoted on said resilient means and adapted to be actuated by said means to engage the saddle stops.

5. In a spring toggle the combination of a saddle having stops and pivots, a coil spring mounted on one of said pivots, and wings pivoted on said coil spring and adapted to be actuated by said coil spring to engage the saddle stops.

6. In a spring toggle the combination of a saddle having pivots, wings provided with enlarged pivoting holes, and a coil spring mounted on one of the pivots and within the enlarged pivoting holes of the wings, said coil spring having its two ends cooperating with the different wings to actuate them.

7. In a spring toggle to go into a hole of minimum diameter to support the required work, the combination of a saddle of minimum diameter, short pivots carried by the saddle, comparatively narrow wings having pivoting holes at least one adjacent hole of each wing being of greater diameter than the pivot with which it cooperates, and a coil spring mounted on the pivot and within the said enlarged pivoting holes of said wings, and adapted to actuate the wings.

8. In a spring toggle the combination of a saddle having a diameter substantially equal to the thickness of the metal of the saddle, plus the thickness of the metal of the wings, plus the diameter of the co-operating bolt, pivoting wings mounted on the saddle and resilient means also mounted on the saddle adapted to actuate the wings.

9. In a spring toggle, the combination of a saddle, pivoted wings, and resilient means to operate the wings, said resilient means forming a part of the bearing for the pivoted wings.

10. In a spring toggle the combination of a saddle, pivoted wings, and a coil spring adapted to actuate the pivoted wings in one direction, said coil spring forming a part of the bearing for the pivoted wings.

11. In a spring toggle the combination of a saddle, wings pivoted to the saddle and resilient means adapted to cause the wings to rock on their pivots, said resilient means being concealed by the ends of two adjacent wings.

12. In a spring toggle the combination of a saddle provided with supporting means, wings provided with pivoting means, resilient means mounted on one of the supporting means of the saddle, two of the pivoting means of the wings mounted on the resilient means and forming a housing for it, the other pivoting means of the wings cooperating with the other supporting means of the saddle.

JOHN KARITZKY.